3,634,251
METHOD OF MAKING ELECTROPHOTOGRAPHIC TONER BY POLYMERIZING IN AN AQUEOUS SUSPENSION

Kazuo Maeda and Yukihisa Shibasaki, both c/o Iwasaki Tsushinki Kabushiki Kaisha 7-14, Kugayama 1-chome, Suginami-ku, Tokyo, Japan
No Drawing. Filed Mar. 4, 1969, Ser. No. 804,305
Claims priority, application Japan, Mar. 6, 1968, 43/14,021
Int. Cl. G03g 9/02
U.S. Cl. 252—62.1         4 Claims

---

ABSTRACT OF THE DISCLOSURE

Toner usable for forming electrophotographic image having a high resolving power, which is manufactured by suspension polymerization of at least one monomer having more than a polar radical selected from —$NH_2$, —OH, —$NO_2$ or halogen in water in the presence of coloring material and insoluble inorganic fine powder. The polar radicals of the obtained polymer generate a polarity on the surface of the polymer because of orientation of permanent dipoles of the polymer.

---

The present invention relates to toner usable for electrophography and a manufacturing method of the same, more particularly relates to a toner comprising synthetic polymer's particles having polarized surfaces by permanent dipole and a manufacturing method of the same.

In the conventional method for manufacturing, the toner for usable electrophotography, a thermoplastic resin and a coloring material such as a dye and a pigment is mixed and melt-kneaded at a high temperature, the mixture is cooled down to room temperature and crushed into fine particles. A method in which the fine particles are coated by suitable material is disclosed already too.

However, it is well-known that a toner which has been manufactured by conventional methods is accompanied with such drawbacks as:

(1) Poor uniformity in the particle size
(2) Insufficient and unstable polarity of the particle
(3) Unstable polarity of the coated particle
(4) Unsatisfactory resolving power and
(5) Expensive manufacturing cost.

An object of the present invention is to provide toner usable for electrophotography having a sufficient and stable polarity and a manufacturing method of the same.

Another object of the present invention is to provide toner usable for electrophotography having a sufficient uniform fineness and high resolving power and a manufacturing method of the same.

In the manufacturing method of the toner according to the present invention, a liquid monomer which can be polymerized linearly and having polar radical is subjected to suspension polymerization in water in the presence of coloring material and insoluble inorganic fine powder. After completion of the mentioned polymerization, the inorganic fine powder is separated and eliminated from the polymer thus obtained.

The monomer to be used in the method of the present invention is selected from liquid compounds having amino, hydroxy, nitro or halogen radical, such as aminostyrene, nitrostyrene, hydroxyethyl methacrylate aminoethyl methacrylate.

When such monomer is subjected to emulsification in water, the permanent dipoles of the monomer molecule are oriented in a certain order facing the interface because of strong polarity of water as dispering medium. This characteristic order of the dipole of the monomer, at the time of the mentioned polymerization, results in the orientation of the permanent dipoles of the acquired polymer in the same order facing the particle surface. Consequently, the surface of the polymer particle is polarized positively or negatively corresponding to the kind of polar radical.

The amino and hydroxy radicals arranged near the surface bestow a positive polarity to the surface, but the nitro and halogen radicals arranged near the surface bestow a negative polarity to the surface. These radicals are substituted on a main chain and/or side chain of the polymer molecule, particularly it is desirable that the radicals be substituted on the side chain.

Also, the monomer having the polar radical may be subjected to copolymerization with other monomers, and the polymerization initiator having the above-mentioned polar radical may be used for the polymerization to be introduced to the polymer chain ends. Further the mentioned polarization of the toner can be effectively promoted by using a dye having the aforementioned radical, or more effectively, an oil-soluble dye which is well soluble in the monomer and polymer.

In the method of the present invention, the polymerization of the monomer having the polar radical is carried out in the presence of insoluble inorganic fine powder such as calcium hydroxide, calcium carbonate, barium hydroxide, barium carbonate, zinc oxide, aluminum oxide, etc. The inorganic fine powders are insoluble or difficut to dissolve in water, and act as a dispersion stabilizer in the polymerization system. Generally, some kinds of organic surface active agents are used as a dispersing agent for polymerization. These surface active agents are absorbed on the surface of the obtained polymer particles because of its hydrophobic group. However, these surface active agents are antistatic in general. Consequently, the polarity of the surface is weakened and become insufficient.

Compared with the organic surfactant, the above-mentioned inorganic dispersion stabilizers can be separated and eliminated easily from the polymerization system by treatment with a solution of acid such as hydrochloric acid, sulfuric acid, acetic acid, etc. or of alkali such as sodium hydroxide. Then, the polarity of the obtained toner does not become weakened.

Calcium hydroxide and calcium carbonate are most suitable to the polymerization system of the present invention. They can be prepared as fine crystalline powder with good wetting property by mixing a solution of dissolved sodium hydroxide or sodium carbonate with a solution of dissolved calcium chloride and carrying out the double decomposition as follows,

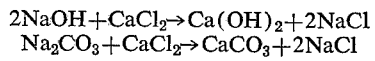

$$2NaOH + CaCl_2 \rightarrow Ca(OH)_2 + 2NaCl$$
$$Na_2CO_3 + CaCl_2 \rightarrow CaCO_3 + 2NaCl$$

The toner particle manufactured by the method of the present invention is uniform and completely spherical and having a diameter from about 5 to about 20 microns. The size of the particle can be adjusted as desired by a suitable selection of the polymerization condition.

The melting point of the toner, which is a necessary property from the view point of thermal fixing of electrophotographic image, can be adjusted by the degree of polymerization. The degree of polymerization is adjusted upon the conditions of polymerization such as temperature, time for polarization, kind and concentration of polymerization initiator, concentration of monomer, condition of stirring.

The color of the toner can be changed as desired by a selection of the dye or the pigment used.

As explained in detail above, it is possible to control, as desired, the polarity, melting point, particle size and color of the toner by the method of the present invention. Consequently, any required type of toner can be manufactured in accordance with the object of use at a lower cost than the conventional method. Namely, toner for developing a positive image from a positive original by the Electrofax process has positive polarity, but toner for developing a positive image from a negative original has negative polarity. Toner for color developing has a required color and toner for line drawings has strong polarity, but toner for solid block has weak polarity. Also, a combined effect can be obtained when several kinds of toner are mixed.

Next, the toner and the manufacturing method thereof according to the present invention will be further explained by the following examples.

EXAMPLE 1

First, calcium hydroxide of 100 parts by weight is suspended in water of 400 parts by weight. Secondly, a mixture of benzoylperoxide of 5 parts by weight as a polymerization initiator and carbon black of 5 parts by weight as a coloring material is mixed with a mixture of p-aminostyrene of 20 parts by weight and styrene of 80 parts by weight. Thirdly, the first suspension is added to the second mixture, and the third mixture is stirred for 30 minutes a mixer. Then, a system of suspension polymerization for manufacturing a block toner is prepared. The system is heated at a temperature of 80° C. for four hours while stirring. After the polymerization is completed, the system is cooled to a room temperature and the calcium hydroxide is dissolved completely by addition of a 10% solution of hydrochloric acid.

The fine particles of copolymerized styrene and aminostyrene in the system are filter washed with water for eliminating the organic dispersion stabilizer and dried. Then, a block toner having positive polarity is obtained.

The average diameter of the obtained particles was 7 microns, and static voltage of the toner and resolving power by the toner was as shown in Table 1. For the purpose of comparison, polyamide styrene of 20 parts by weight, polystyrene of 80 parts by weight and carbon black of 5 parts by weight were mixed and melt-kneaded at 110° C., the obtained composition is cooled down to a room temperature and crushed into fine particles having an average diameter of 32 microns. Then, a comparison toner was prepared.

Properties of the comparison toner were as shown in Table 1.

TABLE 1

| | Static voltage of toner (v./g.) | Resolving power (line/mm.) |
|---|---|---|
| Toner of the present example | +300 | 50 |
| Comparison toner | +50 | 10 |

EXAMPLE 2

A block toner having negative polarity on its surface was obtained from p-nitrostyrene of 8 parts by weight, p-chlorostyrene of 2 parts by weight, styrene of 90 parts by weight, azo-bis-isobutyronitrile of 5 parts by weight, Spilon Black of 5 parts by weight which is a metalized oil-soluble dye, calcium hydroxide of 100 parts by weight and water of 400 parts by weight in a manner the same as that in Example 1.

The temperature of polymerization was 70° C. and the time of polymerization was 5 hours. For the purpose of comparison, a comparison toner was perpared from poly-nitrostyrene of 10 parts by weight, polystyrene of 90 parts by weight and Spilon Black of 5 parts by weight in a manner the same as that in Example 1.

Properties of the toner obtained in the present example and the comparison toner were as shown in Table 2.

TABLE 2

| | Size of particle (micron) | Static voltage of toner (v./g.) | Resolving power (line/mm.) |
|---|---|---|---|
| Toner of the present example | 8.1 | −310 | 50 |
| Comparison toner | 40 | −45 | 8 |

EXAMPLE 3

A blue toner having positive polarity was obtained from amino-ethylmethacrylate of 20 parts by weight, methyl methacrylate of 80 parts by weight, benzoyl-peroxide of 5 parts by weight, phthalocyanine blue of 5 parts by weight, calcium hydroxide of 50 parts by weight, calcium carbonate of 50 parts by weight and water of 400 parts by weight in a manner the same as that in Example 1.

A comparison toner was prepared from amino methacrylate of 20 parts by weight, methyl-methacrylate of 80 parts by weight and phthalo-cyanine blue of 5 parts by weight in a manner the same as that in example. Properties of the toner obtained in the present example and the comparison toner were as shown in Table 3.

TABLE 3

| | Size of particle (micron) | Static voltage of toner (v./g.) | Resolving power (line/mm.) |
|---|---|---|---|
| Toner of the present example | 6.5 | +280 | 55 |
| Comparison toner | 35 | +60 | 14 |

EXAMPLE 4

A yellow toner having positive polarity was obtained from hydroxyethyl methacrylate of 20 parts by weight, methyl methacrylate of 80 parts by weight, benzoyl-peroxide of 5 parts by weight, Benzidine Yellow GR (Pigment Yellow 13) of 5 parts by weight, calcium hydroxide of 50 parts by weight, calcium carbonate of 50 parts by weight and water of 400 parts by weight in a manner the same as that in Example 1.

The temperature of polymerization was 75° C. and the time of polymerization was 5 hours.

A comparison toner was prepared from hydroxyethyl-methacrylate of 20 parts by weight, methyl-methacrylate of 80 pounds by weight and Benzidine Yellow GR of 5 parts by weight in a manner the same as that in Example 1.

Properties of the toner obtained in the present example and the comparison toner were as shown in Table 4.

TABLE 4

| | Size of particle (micron) | Static voltage of toner (v./g.) | Resolving power (line/mm.) |
|---|---|---|---|
| Toner of the present example | 9.5 | +305 | 60 |
| Comparison toner | 53 | +80 | 13 |

As shown in Tables 1, 2, 3 and 4, it is clear that the toner of the present invention has excellent properties for electrophotography when compared with the toner manufactured by the conventional method.

What is claimed is:

1. A method of manufacturing an electrophotographic toner having a high polarity comprising polymerizing in an aqueous suspension a dispersion of at least one polymerizable polar monomer selected from styrene and methacrylate ester wherein said styrene and said methacrylate ester is substituted by at least one polar radical selected from the group consisting of amino, hydroxy, nitro and halogen in the presence of a polymerization initiator, at least one coloring material selected from carbon black, oil soluble dye and pigment, and at least one inorganic compound which is at most slightly soluble in water selected from the group consisting of calcium hydroxide, calcium carbonate, barium hydroxide, barium carbonate, zinc oxide and aluminum oxide, whereby colored polymeric fine particles having a high polarity are obtained as a suspension in the aqueous medium, dissolving said inorganic compound in said aqueous medium by the addition of acid or alkali thereto and separating said colored particles from said suspension.

2. A method according to claim 1 wherein said polymer is copolymerized with at least one monomer selected from styrene and methacrylate ester.

3. A method according to claim 1 wherein said coloring material is selected from oil-soluble dyes having at least one radical selected from the group consisting of amino, hydroxy, nitro and halogen.

4. A method according to claim 1, wherein said monomer is copolymerized with at least one polymerization monomer different therefrom.

References Cited
UNITED STATES PATENTS

| | | | |
|---|---|---|---|
| 2,108,044 | 2/1938 | Crawford et al. | 260—89.5 |
| 2,500,023 | 3/1950 | Burk | 260—41 C |
| 2,686,172 | 8/1954 | Wolf | 260—41 C |
| 2,733,219 | 2/1957 | Passine et al. | 260—41 C |
| 3,079,272 | 2/1963 | Greig | 252—62.1 |
| 3,244,633 | 4/1966 | Yellin et al. | 252—62.1 |
| 3,417,019 | 12/1968 | Beyer | 252—62.1 |

OTHER REFERENCES

Fundamental Principles of Polymerization, D'Alelio, 1952, pp. 210–211.

GEORGE F. LESMES, Primary Examiner

J. P. BRAMMER, Assistant Examiner

U.S. Cl. X.R.

260—41 R, 41 C